Patented Mar. 23, 1926.

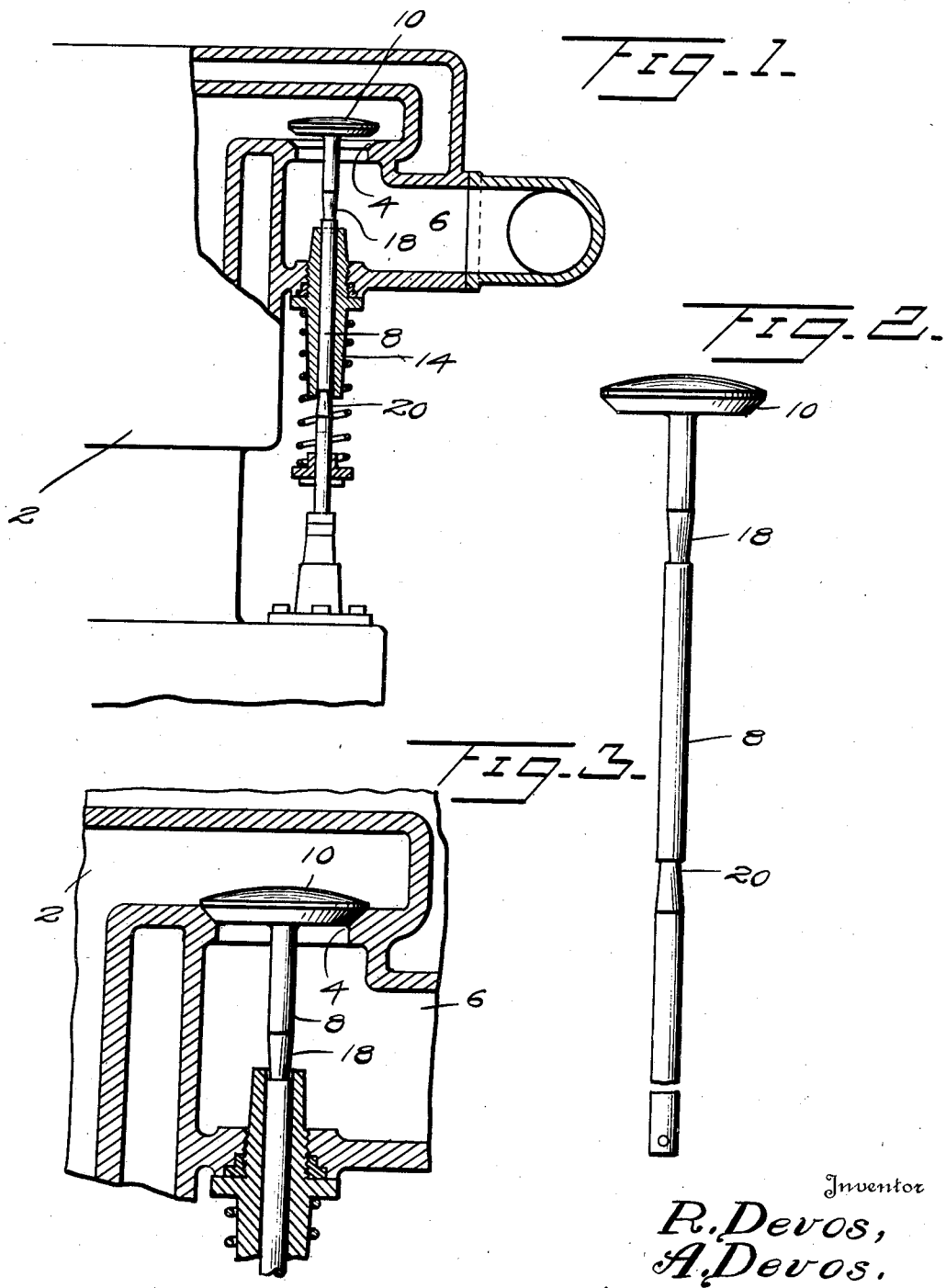

1,578,191

UNITED STATES PATENT OFFICE.

RICHARD DEVOS AND ALOIS DEVOS, OF DETROIT, MICHIGAN.

SUPERVALVE.

Application filed January 8, 1923. Serial No. 611,453.

*To all whom it may concern:*

Be it known that we, RICHARD DEVOS and ALOIS DEVOS, citizens of the United States, residing at Detroit, in the county of Wayne and State of Michigan, have invented certain new and useful Improvements in Supervalves, of which the following is a specification.

This invention relates to a valve structure and particularly to the construction of stem for the use with valves employed in internal combustion engines of various types.

The particular feature of the valve consists in providing the stem thereof with a pair of annular recesses which reduce the cross sectional area of the stem at a point where deposits of carbon or grease would tend to interfere with the full stroke of said stem which would result in failure of the valve to properly seat itself. Such failure to properly seat results primarily in a loss of compression and consequently power.

A further object of the invention is to provide a means for preventing the valve stem from sticking to the valve seat.

Other features and advantages will be clear upon reference to the following specification and claim in conjunction with the drawings.

In the accompanying drawings,

Figure 1 is a fragmentary sectional view showing our improved valve as applied to an internal combustion engine of conventional type, the valve being shown in elevation and raised above its seat.

Figure 2 is an enlarged side elevation in detail of the valve removed, and

Figure 3 is a fragmentary vertical sectional view through the exhaust port of the engine and showing the relation of the valve stem to the sleeve when the valve is seated.

In the drawing, Fig. 1, the engine is shown at 2, formed with a valve seat 4 of the ordinary character, while the exhaust passage communicating therewith is indicated at 6. The structure as described may take any preferred form, depending of course upon the manufacturer, it being understood that our valve as described hereinafter may be readily adapted to any style of stationary or automobile gas engine.

The improved valve, comprises a stem 8 having at its upper end the valve head 10 of usual construction, said stem being adapted to reciprocate in the guide sleeve 14.

For the purpose of eliminating a deposit of carbon upon the stem 8 at a point in proximity to the upper end of the valve guide sleeve 14, to such an extent that it increases the cross-sectional area of said stem and thereby obstructs the reciprocatory action thereof, I provide said stem with an annular recess 18 extending longitudinally thereof and so located that, when the valve is seated, it terminates slightly below the upper end of said sleeve. Thus it will be seen that a sufficient clearance is afforded through the medium of such recess, such that, even though a certain amount of carbon collects on the stem, it will not usually exceed the cross-sectional area of the bore of the guide sleeve, and should an abnormal quantity be collected on said stem at the position mentioned, the upper and inner annular edge of the bore of the sleeve will serve to scrape off any surplus amount.

It is preferred that the reduced portion of the stem which provides the recess 18 taper outwardly and longitudinally in the direction of the head of the valve.

The lower end of the stem below the guide sleeve is similarly provided with an annular recess 20 the wall of which is tapered reversely to that of the recess 18, said recess 20 being so positioned that its upper end lies slightly above the lower end of the guide sleeve opening when the valve is raised from its seat so that perfect clearance at this point is also always assured, it being well known that soot and grease accumulations collect on the valve stem at this point. Being recessed, as shown at 18 and 20, the stem 8 is provided with a pair of shoulders which are adapted to clear or clean the bore of the sleeve 14 of any soot, carbon, or products of combustion which ordinarily have a tendency to lodge therein. The position of the shoulder formed by the recessing 18 in Figure 3 and the position of the opposite shoulder formed by the recessing 20 in Figure 1, clearly disclose the purposes and obvious advantages of this structure.

Our valve stem construction therefore affords perfect clearance throughout those portions which slide within the guide sleeve.

The advantages of our construction will be apparent to those familiar with the construction and operation of internal combustion engines of various types.

Having thus described our invention, what we claim as new and desire to protect by Letters Patent is:—

In combination with a valve seat and guide; of a valve including a head and stem, said stem being slidably received in said guide and provided intermediate of its ends with a pair of spaced apart recesses, said recesses having their walls diverging respectively in opposite directions providing substantially inner opposed shoulders on said stem, said shoulders being adapted to cooperate with the respective end edges of said guide in the operation of said valve, as and for the purposes described.

In testimony whereof we affix our signatures.

RICHARD DEVOS.
ALOIS DEVOS.